United States Patent [19]

Murata

[11] Patent Number: 5,412,695

[45] Date of Patent: May 2, 1995

[54] METHOD AND DEVICE FOR REMOVING FREQUENCY OFFSET

[75] Inventor: Hiroyasu Murata, Kawasaki, Japan

[73] Assignee: Fujitsu Limited, Kanagawa, Japan

[21] Appl. No.: 93,408

[22] Filed: Jul. 19, 1993

[30] Foreign Application Priority Data

Dec. 18, 1992 [JP] Japan ................... 4-338490

[51] Int. Cl.⁶ ............................................ H04L 27/06
[52] U.S. Cl. .................................. 375/344; 375/230; 329/318
[58] Field of Search ............... 375/12, 14, 16, 97, 375/101; 364/724.2; 329/318

[56] References Cited

U.S. PATENT DOCUMENTS

| | | | |
|---|---|---|---|
| 4,394,768 | 7/1983 | Sari | 364/724.2 |
| 4,621,366 | 11/1986 | Cain et al. | 375/106 |
| 5,214,391 | 5/1993 | Serizawa et al. | 375/102 |
| 5,233,632 | 8/1993 | Baum et al. | 375/97 |
| 5,283,813 | 2/1994 | Shalvi et al. | 375/12 |
| 5,297,165 | 3/1994 | Ueda et al. | 375/14 |

*Primary Examiner*—Stephen Chin
*Assistant Examiner*—Timothy J. May

[57] ABSTRACT

A device for removing a frequency offset in modem reception signals includes a sampling part for sampling signals, a carrier phase control (CAPC) part to compute and correct a frequency offset value $\theta_1$, an automatic equalizer, a determining circuit, and a frequency offset computing part disposed between the automatic equalizer and the determining circuit to separately compute the frequency offset value $\theta_2$ from a vector signal sampled in the sampling part. The frequency offset value $\theta_2$ is compared with the frequency offset value $\theta_1$ computed by the carrier phase control part, and when the net error $\Delta\theta$ exceeds a predetermined value, a renewing part forcibly substitutes the first frequency offset value $\theta_1$ in the carrier phase control part with the second frequency offset value $\theta_2$.

8 Claims, 12 Drawing Sheets

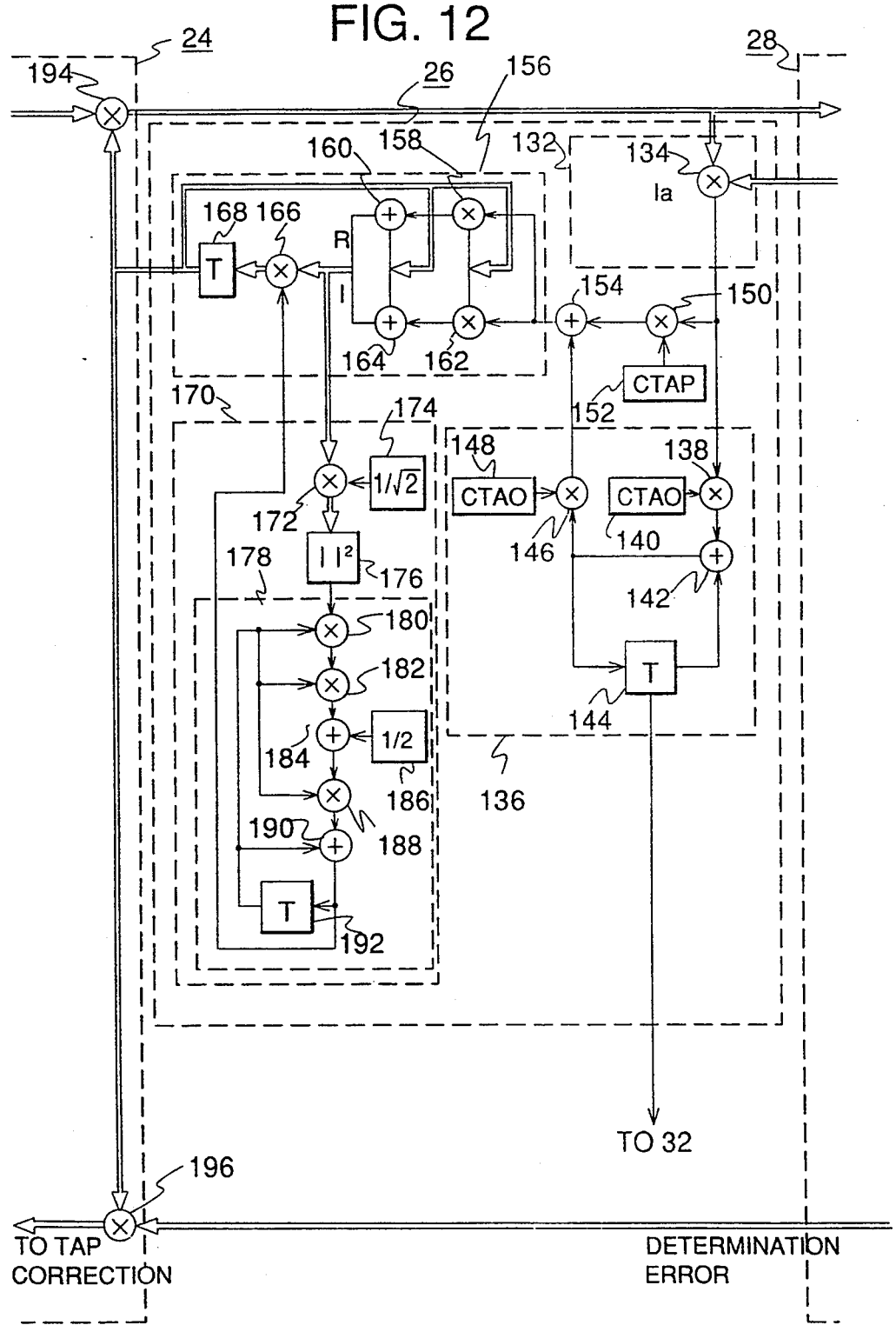

METHOD AND DEVICE FOR REMOVING FREQUENCY OFFSET

BACKGROUND OF THE INVENTION

The present invention relates to a frequency offset removal method and device to remove the frequency offset contained in modem reception signals, and more particularly to a frequency offset method and device that can remove frequency offset that are too large to be removed by an automatic carrier phase-controlling circuit disposed between an automatic equalizer and a decoder.

FIG. 1 shows an equalizing circuit in an automatic carrier phase control of the type used in conventional modem demodulation. The automatic carrier phase-controlling part (12) comprises a normalizing part (200) and a frequency offset computing part (202). The normalizing part (200) receives input in the form of equalizing signals from an automatic equalizer (24) and normalizing signals from a determining part (28), and outputs imaginary components in a remaining equalization signal which has been normalized. The frequency offset computing part (202) computes a frequency offset value $\theta$ which has occurred as a line fluctuation according to the remaining equalization signal, and outputs an offset correction signal that rotates inversely as much as the frequency offset value $\theta$. The offset correction signal from the frequency offset computing part (202) is supplied to a multiplier (206) disposed in the automatic equalizer (24) to remove the frequency offset in an equalizing output signal (208). At the same time, it removes frequency offset in a remaining equalization signal from an adder (204), which has been supplied from the multiplier (208) and returned to a tap correcting part in the automatic equalizer (24).

However, removing the frequency offset using a conventional automatic carrier phase-controlling part has the problem that the frequency offset cannot be removed if the resulting error exceeds half of an angle in a symbol arrangement on the phase determination plane. For example, as shown in FIG. 2, if a frequency offset with $\theta = 45°$ or more to an adjoining symbol has occurred when four symbols (P1 through P4) are arranged on the same radius of the phase plane at a 90° interval, then the set symbol of the reception symbol causing the frequency offset cannot be identified. As a result, the carrier phase may not correct the frequency offset, the frequency offset that has been caused from switching a network cannot be restored, and the modem freezes up. Demodulation using a narrow band with a low modulation rate such as in a subchannel, which makes each symbol cycle longer, is prone to large frequency offsets, which cannot be covered by an automatic carrier phase-controlling part in the manner of normal bandwidths.

SUMMARY OF THE INVENTION

According to the present invention is to provide a frequency offset removal method and device therefore that can reliably remove frequency offset, even at error levels that exceed half the angle of the phase determination plane.

The modem demodulating part to which the present invention applies includes a sampling part such as a roll-off filter that digitally samples a vector signal with real and imaginary components from a line reception signal. The vector signal sampled by the sampling part is processed through an equalizer to remove distortion caused by inter-code interference on the line. Subsequently a determining part determines the correct signal point on a phase plane using an equalization output signal. A carrier phase-controlling part computes a first frequency offset value $\theta$ based on the equalization output signal and the remaining equalization signal and is defined as the difference between the equalization output signal and a determination signal. The carrier phase-controlling part then corrects the equalization output signal and the remaining equalization signal. For such a modem demodulating part, according to the present invention, a second frequency offset $\theta_2$ is computed separately by a frequency offset computing part, using the vector signal sampled at the sampling part. Then, the second frequency offset value $\theta_2$ is compared with the frequency offset value $\theta_1$. When an error $\Delta\theta$ exceeding a predetermined value occurs between both values, a renewing part initializes the second frequency offset value $\theta_2$ to the first frequency offset value $\theta_1$. This means that $\theta_2$ is set to the first frequency offset value $\theta_1$ at the carrier phase-controlling part.

The carrier phase-controlling part is disposed with a second integrating part to generate an offset correction signal that rotates inversely by the frequency offset value $\theta_1$ computed at a first integrating part, whereas the renewing part initializes the second frequency offset value $\theta_2$ to the first frequency offset value $\theta_1$.

The frequency offset computing part of the present invention comprises phase difference computing parts, low pass filters, inverse number computing parts, a scalar converting part, and an offset value correcting part. The phase difference computing part inputs a vector signal with real components and imaginal components that have been sampled, and computes the phase difference in the input signal. The low pass filter averages out phase difference signals computed at the phase difference computing part, the averaging process can take up to one minute. The inverse number computing part standardizes the amplitudes in the phase difference signals obtained by the low pass filter to a constant value. The scalar converting part converts the vector signal, sin $\theta$, derived at the inverse number computing part, into an angle signal $\theta$ (a scalar quantity) that indicates the second frequency offset value $\theta_2$. Further, the offset value correcting part converts levels so that the angle signal value $\theta_2$ obtained at the scalar converting part can be initialized to the first frequency offset value $\theta_1$ computed at the automatic carrier phase-controlling part.

The sampling part of the present invention samples the vector signals at a rate N times faster than the symbol modulation rate. Assuming the symbol modulation rate is 48 baud, for example, the sampling rate will be 240 baud. The phase difference computing part computes the phase difference between N number of vector signals sampled during one symbol cycle, which is given by the inverse number of the modulation rate. Specifically, it computes two vector signals, separated by an intervening signal, from the N vector signals sampled during one symbol cycle, computes the phase difference signals (N-2) times every symbol cycle, and then outputs the signal to a low pass filter. Given a symbol modulation rate of 48 baud and corresponding sampling rate of 240 baud, per symbol cycle, the phase difference in two vector signals, separated by an intervening signal, is computed three times. The low pass filter performs an averaging processing as the difference signal is issued from the phase difference computing part, and the processing result is output to the inverse number computing part at the next stage once every symbol cycle.

At the same time, data processing in each part of the frequency offset computing part is carried out by a floating point converting part, which coverts fixed point vector signals into floating point vector signals. The phase difference computing part and the low pass filter handle the floating point vector signals. The inverse number computing part contains two computing parts. The first inverse number computing part normalizes a vector signal floating point into an amplitude value on a square in which a standard circle with a standard radius of 1.0 is inscribed. The inverse part also contains a fixed point converting which converts floating point vector signals outputted from the first inverse number computing part, and the second inverse number computing part which normalizes a converted fixed point vector signals into an amplitude value on a standard circle with a standard radius of 1.0.

If, during a communication, a frequency offset occurs that exceeds half of the symbol phase angle on a phase determination plane and which cannot be covered by an automatic carrier phase-controlling part, the difference $\Delta\theta$ may increase between the frequency offset value $\theta_1$, which is computed at the automatic carrier phase-controlling part from the equalizing output, and the frequency offset value $\theta_2$, which is computed from the sampling output from the roll-off filter. In the event that the frequency offset difference $\Delta\theta$ exceeds a predetermined value, the present invention allows the automatic carrier phase-controlling part to follow the large frequency offset change by initializing the frequency offset value $\theta_1$, from the automatic carrier phase-controlling part, to the frequency offset value $\theta_2$, which is separately computed. This makes possible to handle line fluctuations which exceed half the symbol phase angle on the phase determination plane, and to restore the modem to a communicable condition following such a line fluctuation without any deadlock occurring.

The above and other objects, features, and advantages of the present invention will become more apparent from the detailed description and drawings which follow.

BRIEF DESCRIPTION OF THE DRAWINGS

FIG. 12 is a block diagram showing details of the automatic carrier phase-controlling circuit shown in FIG. 3.

DETAILED DESCRIPTION OF THE PREFERRED EMBODIMENTS

Figure 1:
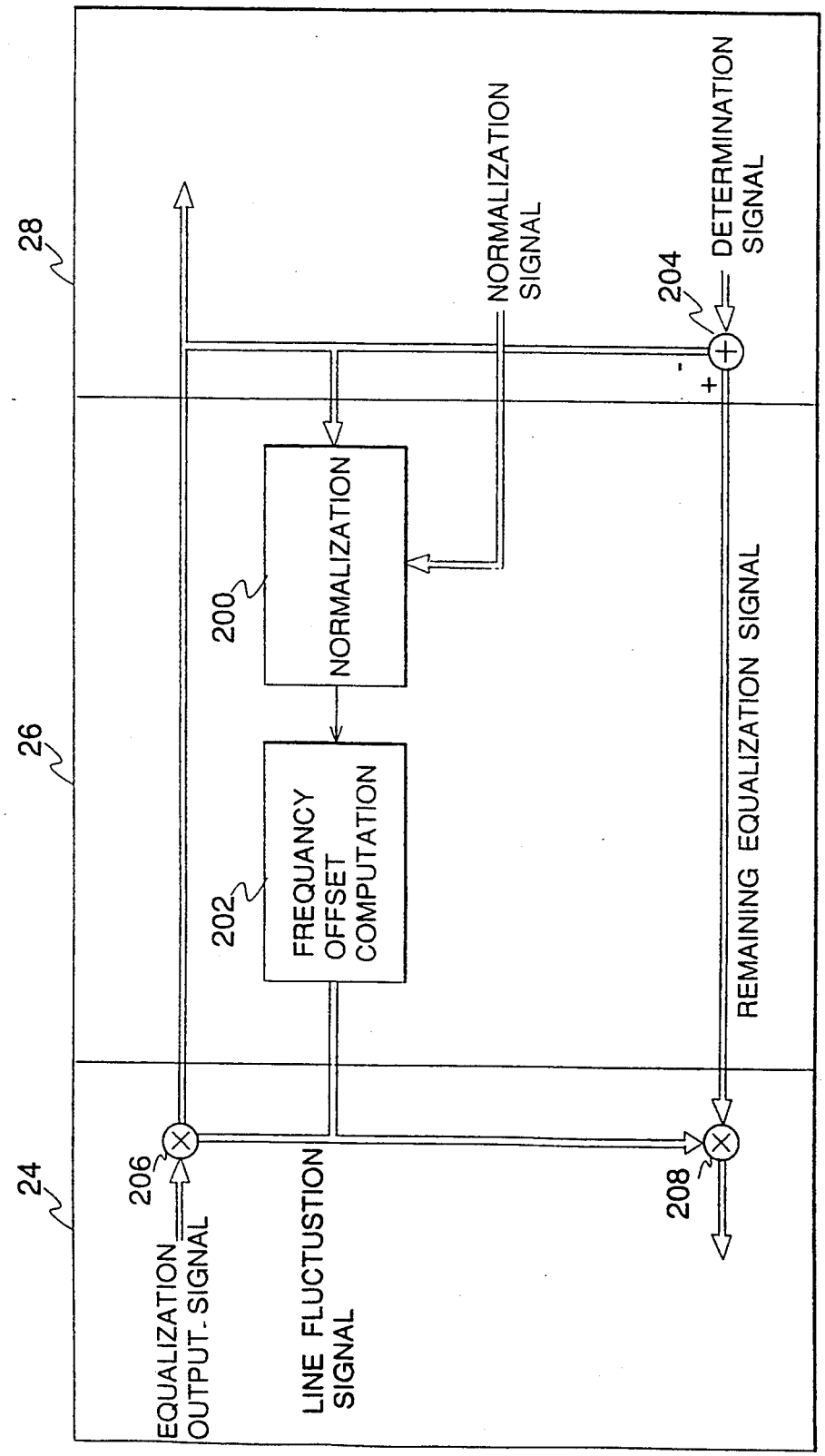
FIG. 1 is a block diagram showing a conventional frequency offset removal device.
Figure 2:
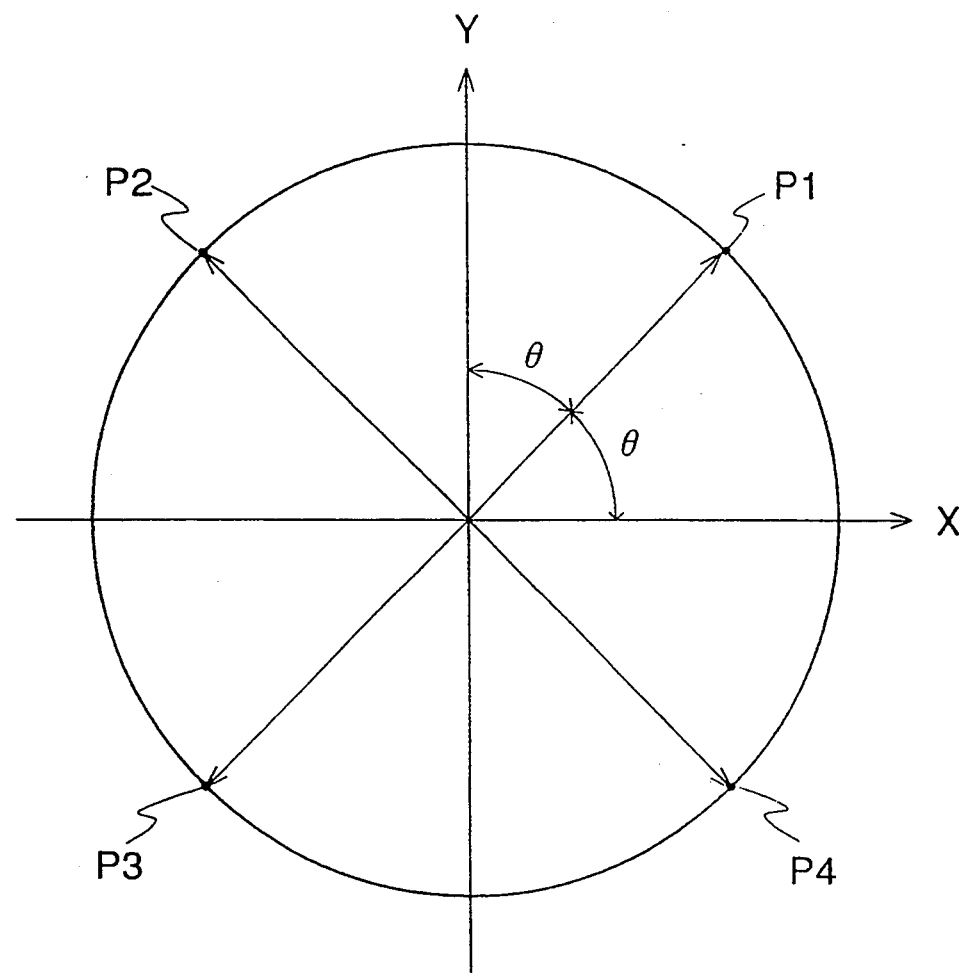
FIG. 2 is a drawing that illustrates the symbol points on a phase determination plane.
Figure 3:
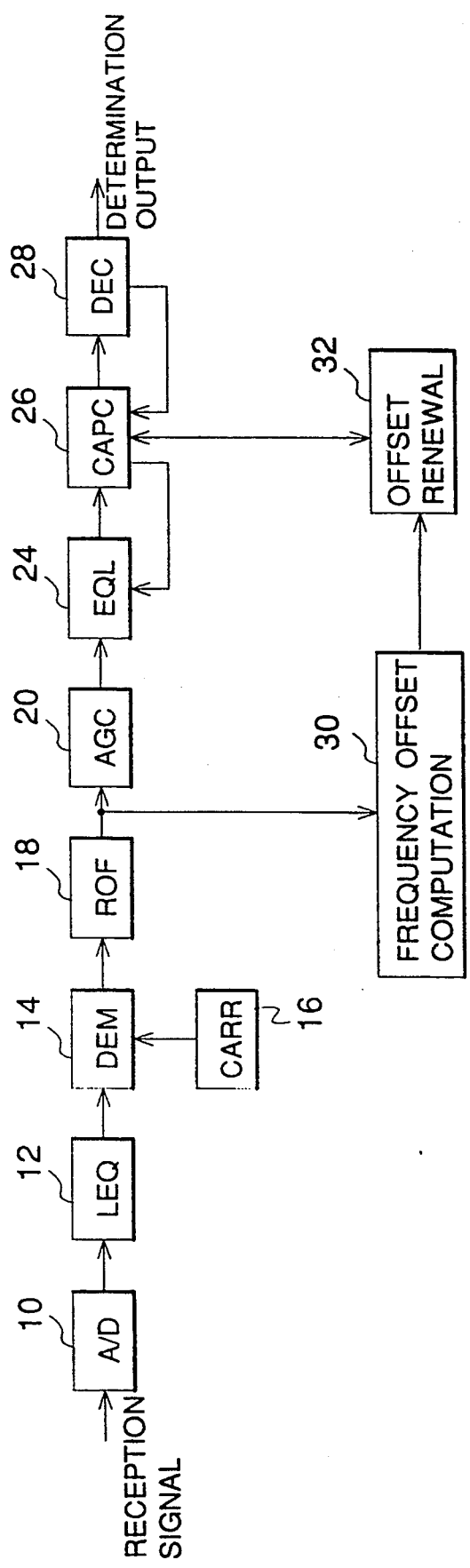
FIG. 3 is a block diagram showing a modem demodulation part to which the present invention has been applied.

FIG. 3 shows a modem demodulating part to which the frequency offset removal device outlined in the present invention has been applied. The modem demodulating part comprises an A/D converter (10), a line equalizer (12), a demodulator (14), a carrier generator (16), a roll-off filter (18), an AGC circuit (20), an automatic equalizer (24), an automatic carrier phase-controlling circuit (26), and a determining circuit (28). More specifically, the A/D converter samples a reception signal from a line using a sampling frequency corresponding to the modulation rate, and converts the signal digitally into a vector signal with real and imaginary components. If the modem shown in FIG. 3 handles a reception signal from a secondary channel with a modulation rate of 48 baud, for example, then the sampling frequency of the A/D converter (10) is 48 Hz, which corresponds to the modulation rate of 48 baud. However, since a 240 Hz frame cycle is used as modulation rate for data transfer in a primary channel, the A/D converter sets the sampling frequency to 240 Hz to synchronize with the frame cycle. Therefore, the A/D converter samples the vector signal five times per symbol cycle. The line equalizer (12) removes line distortion according to the equalizing characteristics in order to compensate for the predetermined line degradation characteristics. The demodulator (14) demodulates vector signals in the base bandwidth based on a carrier signal from the carrier generator (16). The roll-off filter (18) removes harmonics in the base bandwidth. The AGC circuit (20) automatically controls the gain in order to maintain the output signal at the specified level. The automatic equalizer (24) removes line distortion that occurs as a result of code interference. The automatic carrier phase-controlling circuit (26) removes phase jitter and frequency offset from the line. The frequency offset following scope in the automatic carrier phase-controlling circuit (26) is set to ±8 Hz, in accordance with CCITT recommendations. The determining device (28) determines the correct symbol position from the position of the vector signal on the phase determining plane. The configuration of the modem from the A/D converter (10) to the determining device (28) may be identical to that used in conventional devices.

The present invention includes two new components, a frequency offset computing part (30) and an offset renewal part (32). The frequency offset computing part (30) inputs the signal output from the roll-off filter (18), and computes the frequency offset value $\theta_2$. Such computation is independent from that for the frequency offset value $\theta_1$, which takes place in the automatic carrier phase-controlling part (26). The offset renewal part

(32) compares the frequency offset value $\theta_1$ computed at the automatic carrier phase-controlling circuit (26) with the frequency offset value $\theta_2$ computed at the frequency offset computing part (30), and forcibly initializes frequency offset value $\theta_1$ using frequency offset value $\theta_2$.

Figure 4:
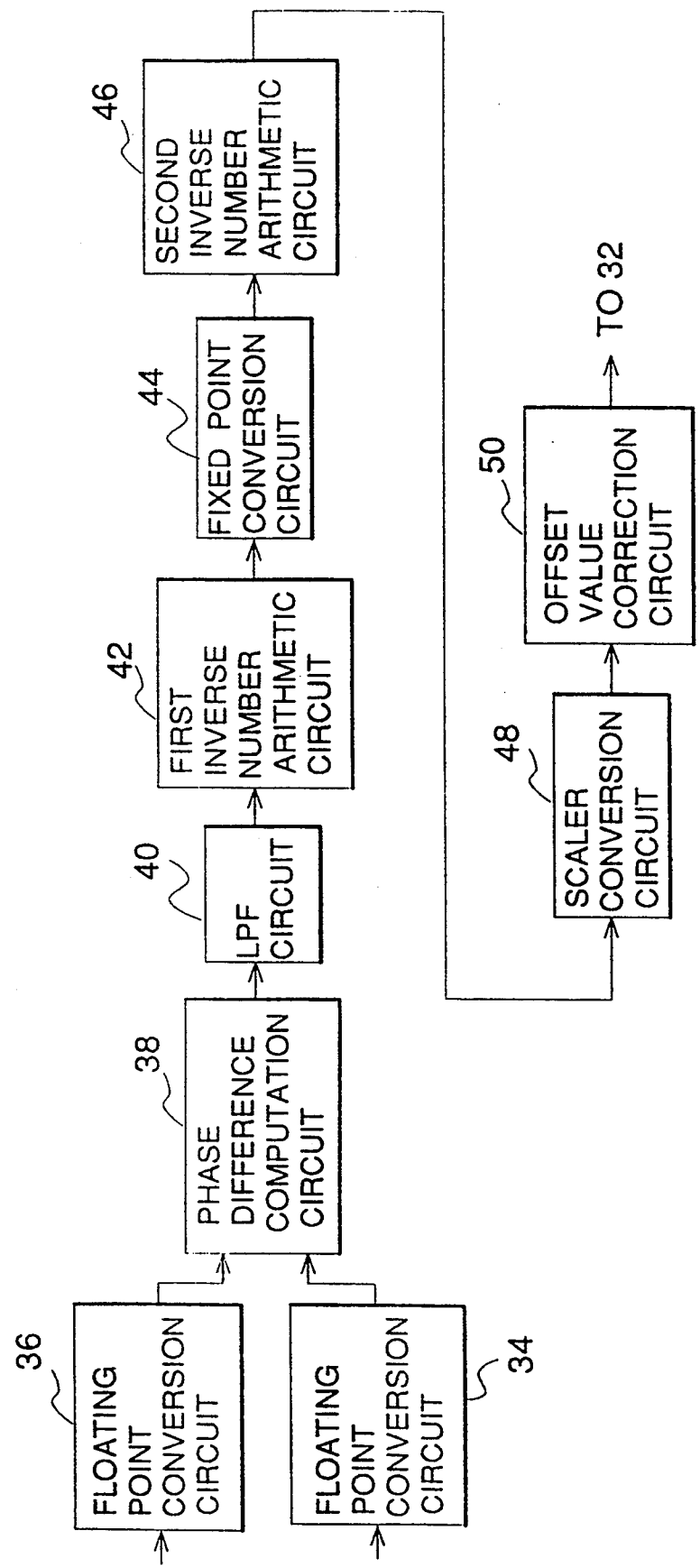
FIG. 4 is a block diagram for the frequency offset computing part shown in FIG. 3.

FIG. 4 shows the overall configuration of the frequency offset computing parts (30). Disposed in the frequency offset computing part (30) are floating point converting circuits (34, 36) to convert fixed point data into floating point data, a phase difference computing circuit (38), a low pass filter circuit (40), a first inverse number computing circuit (42), a fixed point converting circuit (44) to convert floating point data into fixed point data, a second inverse number computing circuit (46), a scalar computing circuit (48) to convert $\sin \theta$ values into scalar volume angles $\theta$, and an offset value correcting circuit (5).

Figure 5:
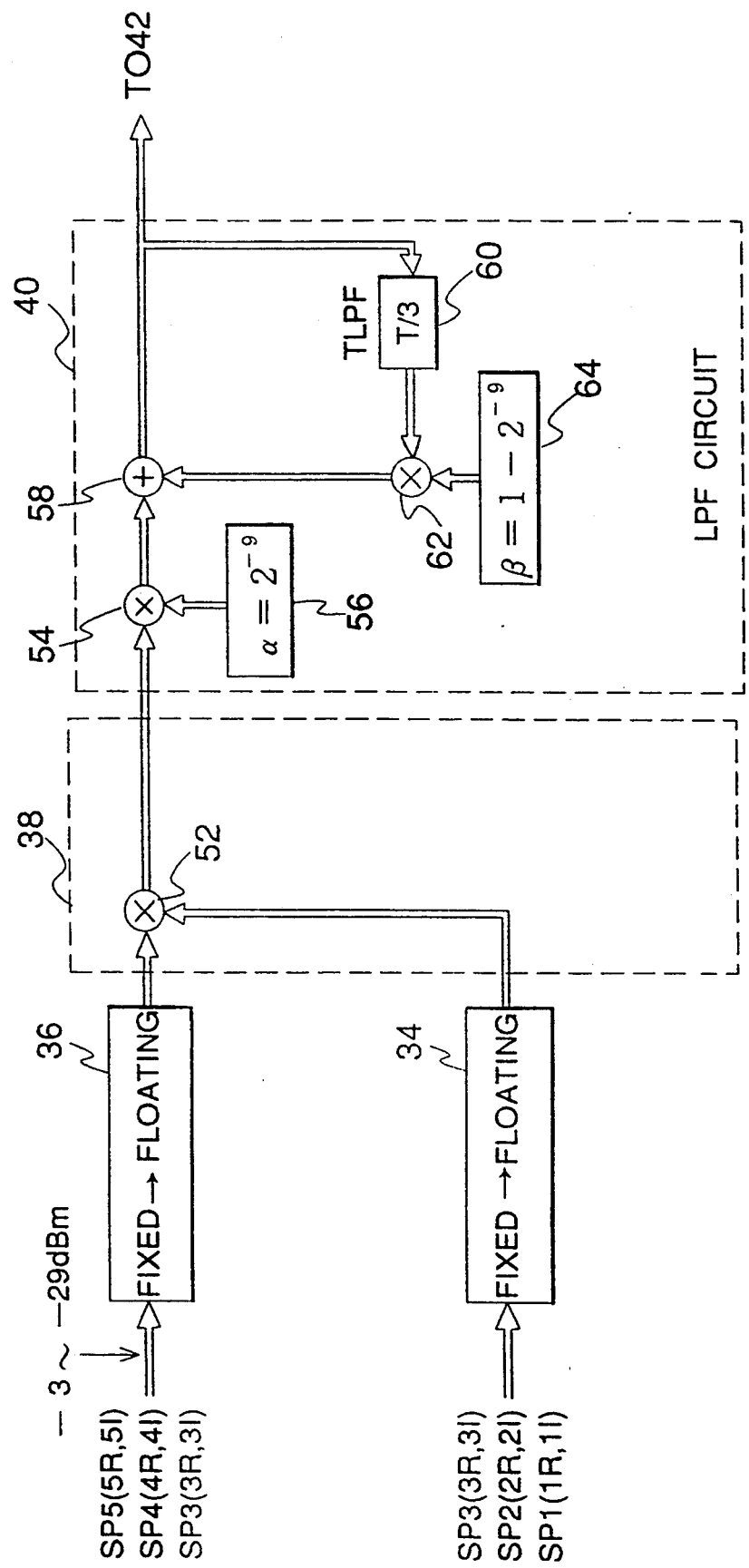
FIG. 5 is a block diagram showing details of the floating point converting circuit, phase difference computing circuit, and low pass filter circuit shown in FIG. 4.
Figure 6:
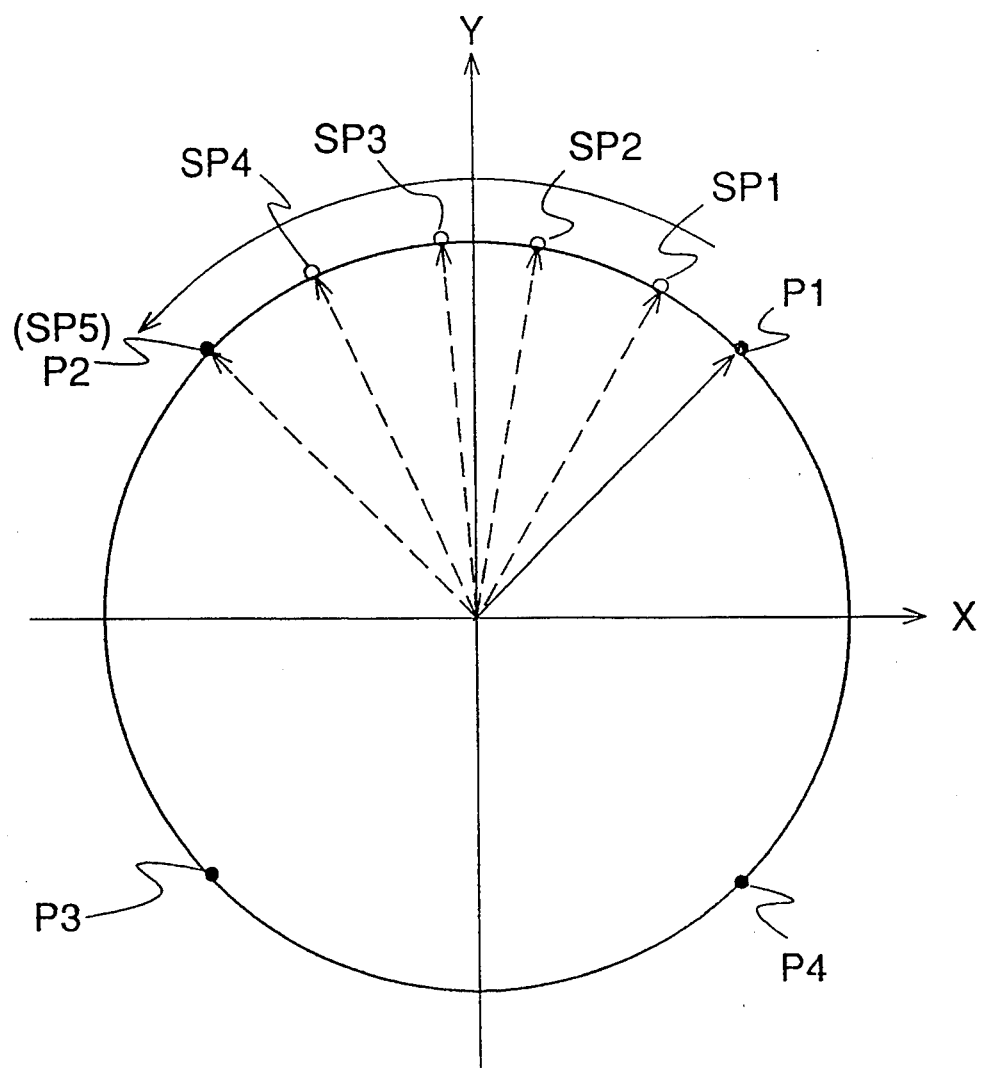
FIG. 6 is a drawing illustrating the sampling process by which a symbol point is switched to an adjoining point.

FIG. 5 shows the floating point converting circuits (34, 36) and the phase difference computing circuit (38), which act as equivalent circuits and use vector computation. Vector signals sampled at 240 Hz are input into the floating point converting circuits (34, 36) and converted into floating point data. The two vector signals output from the floating point converting circuits (34, 36) are supplied to a multiplier (52) in the phase difference computing circuit (38), where the phase difference is computed. FIG. 6 shows an example arrangement of the symbol data handled by this configuration, with four symbols (P1 through P4) arranged on the same radius with phase differences of 90°. These four symbols (P1 through P4) are transmitted at a modulation rate of 48 baud, and one symbol datum is received per symbol cycle, which is the inverse of the modulation ratio of 48 baud. FIG. 6 shows the state of transition when reception of symbol (P1) is switched to reception of symbol (P2). In this embodiment, since the vector signals are sampled at 240 Hz, or five times as fast as the modulation rate of 48 baud, the five vector signals indicated as sampling symbols SP1, SP2, SP3, SP4 and SP5 are obtained during the switch from symbol (P1) to symbol (P2).

For a floating point converting circuit (45), the sampling symbols (SP1 through SP5) are input in a combination of every other symbols at a sampling rate of 240 Hz during one symbol cycle corresponding to a modulation rate of 48 baud, and the phase difference is computed across two sampling vectors, separated by an intervening vector, at the multiplier (52) in the phase difference computing circuit (38). In other words, the phase difference between sampling vectors SP1 and SP3 is first computed, followed by the phase difference between sampling vectors SP2 and SP4 and the phase difference between sampling vectors SP3 and SP5. These computations are repeated for each symbol cycle.

Figure 7:
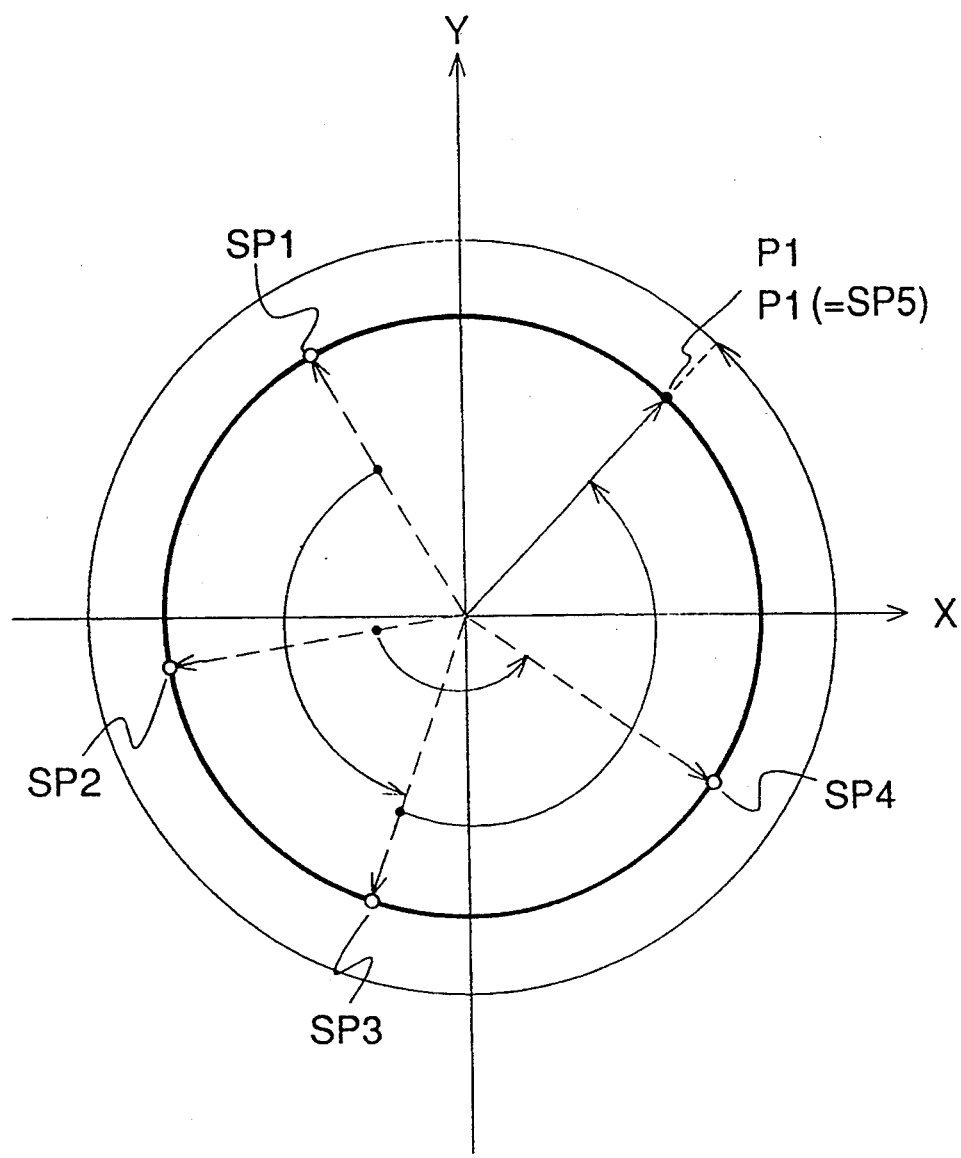
FIG. 7 is a drawing that illustrates the sampling process by which a symbol point is changed by 360.

FIG. 6 shows the transmission method for symbols P1, P2, P3 and P4. These symbols are sent practically at random after being scrambled at the transmission side. The largest change in the symbol phase angles, if the symbol P1 is used as an example, causes the vector in symbol P1 to make one rotation during a single symbol cycle, as shown in FIG. 7, and then to return to the original position, as indicated by the symbol P1'. Since five samplings are also made in this case, given a sampling frequency of 240 Hz during each symbol cycle, the five vectors indicated by sampling symbols SP1 through SP5 are sampled, and the respective phase differences between SP1 and SP3, between SP2 and SP4, and between SP3 and SP5 are computed.

The next section explains the low pass filter (40) in FIG. 5. The low pass filter (40) comprises multipliers (54, 62), constant setting devices (56, 64), an adder (58) and a tap (60). This low pass filter (40) realizes an averaging processing of $$\alpha(1-\beta Z^{-1})$$

in accordance with a transfer function as the low pass filter, where $Z^{-1}$ is the tap value TLPF in the tap (60). Constants producing averaging processing of over one minute are used for setting value $\alpha$ using the constant setting device (56) and the constant $\beta$ using the constant setting device (64). The constants $\alpha = 2^{-9}$ and $\beta = 1 - 2^{-9}$ were determined experimentally. Further, while the low pass filter (40) inputs the phase difference signals from the phase difference computing circuit (38) three times in one symbol cycle at a modulation rate of 48 baud, it outputs an averaged phase difference signal to the first inverse number computing circuit (42) in the next stage that corresponds to one of the phase difference signals above. In other words, two phase difference signal inputs are averaged only in the low pass filter circuit (40), while the result of averaging the third phase difference signal input is output to the next stage. Therefore, the low pass filter (40) generates output every symbol cycle according to the modulation rate of 48 baud.

Figure 8:
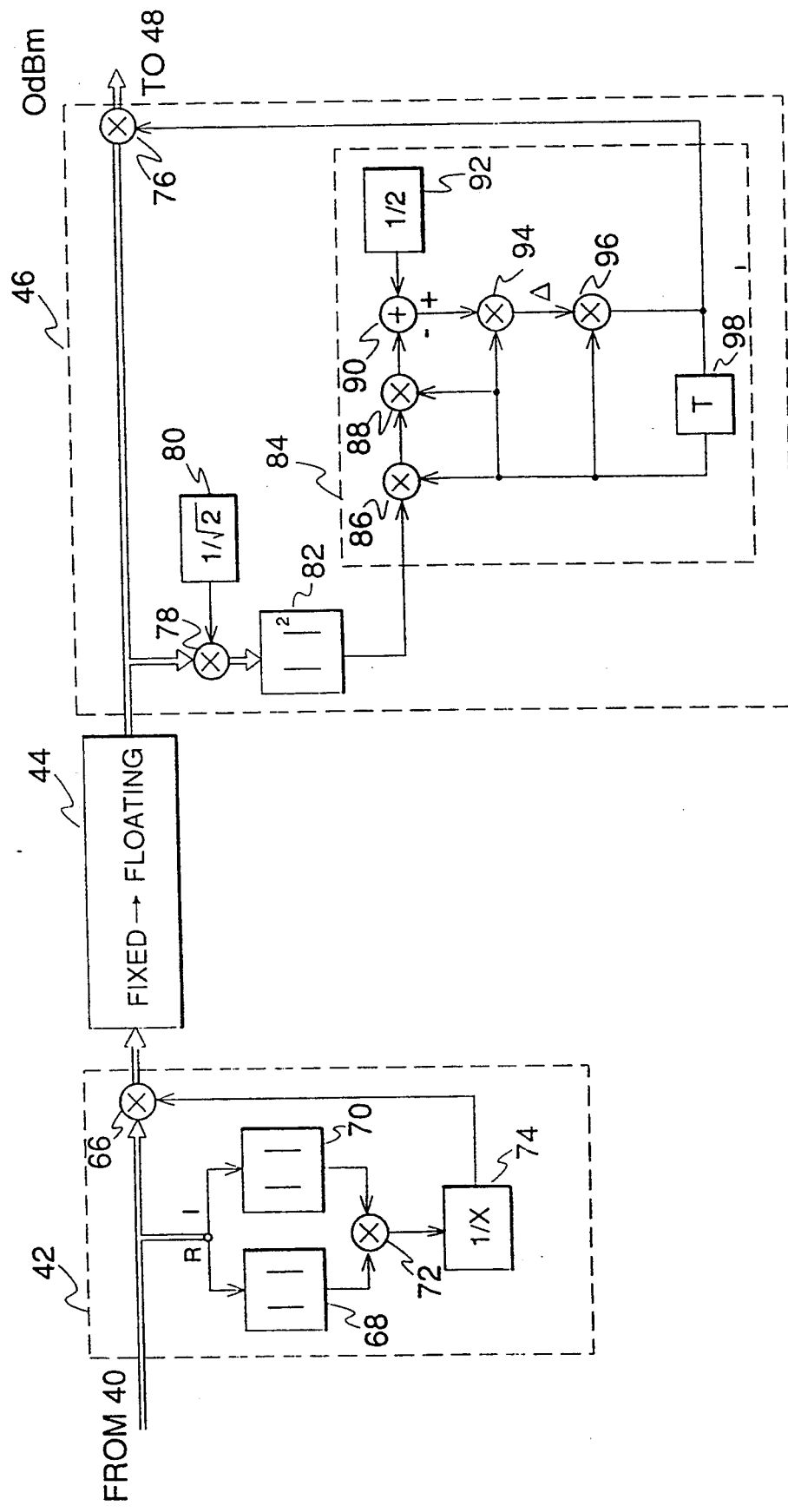
FIG. 8 is a block diagram showing details of the first inverse number computing circuit, the fixed point converting circuit, and the second inverse number computing circuit shown in FIG. 4.
Figure 9:
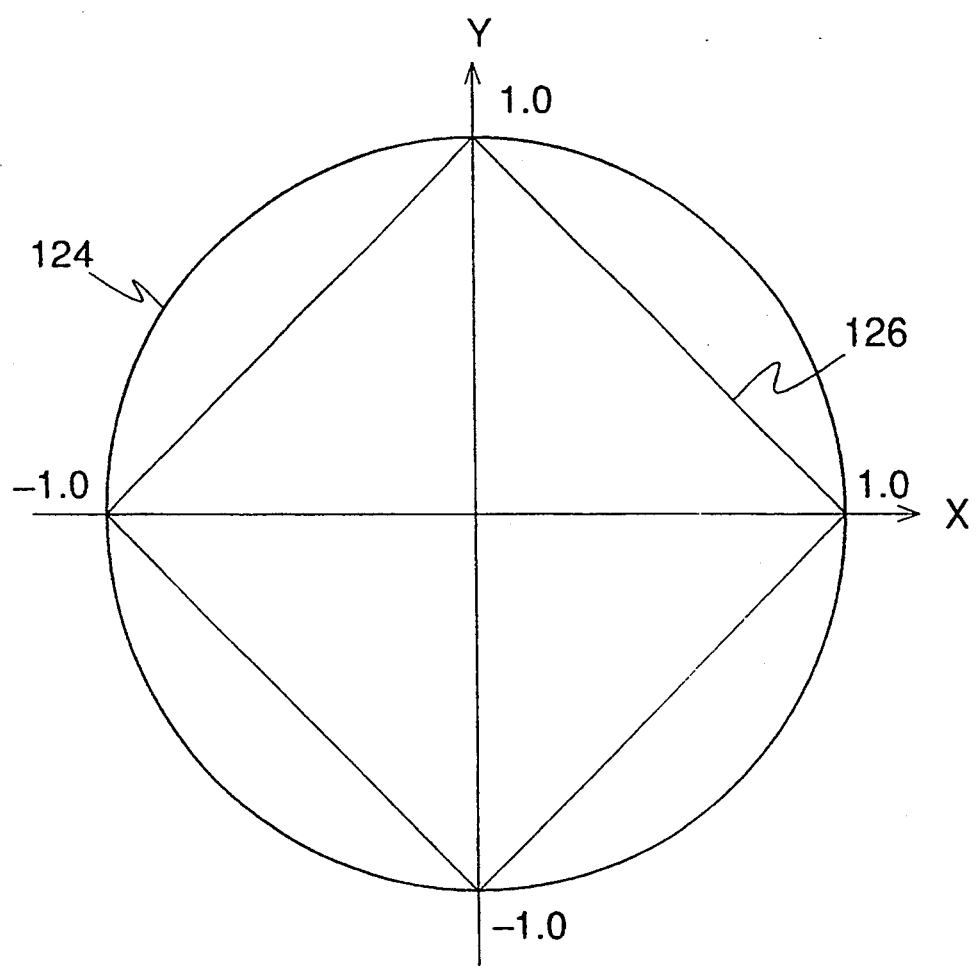
FIG. 9 is a characteristics chart for amplitude normalization with the first inverse number computing circuit shown in FIG. 8.

FIG. 8 shows equivalent circuits that use vector computation by the first inverse number computing circuit (42), the fixed point converting circuit (44) and the second inverse number computing circuit (46). The first inverse number computing circuit (42) comprises a multiplier (66), absolute number circuits (68, 70), an adder (72), and a divider (74). Since the input value range that can be handled by the second inverse number computing circuit (46) disposed in the latter state is limited, from 0.5 to 2.0, the functions of the first inverse number computing circuit (42) are normalized so that the amplitude can be accommodated within this range. That is, absolute values are derived by the absolute value circuits (68, 70) by dividing a vector signal from the low pass filter (40) in the former stage into real components and imaginary components. These values are then added using the adder (72), their inverse values are derived using the divider (74), and the values are finally multiplied with the input vector using the multiplier (66). As a result, the first inverse number computing circuit normalizes the values to an amplitude on a square (126) in which a standard circle (124) with a standard radius of 1.0 has been inscribed, as shown in FIG. 9. This allows the amplitude of the vector signals input into the second inverse computing circuit (46) in the latter stage to always fall between 0.5 to 2.0. The fixed point converting circuit (44) converts the floating point data used in the computations thus far into fixed point data.

The second inverse number computing circuit (46) normalizes the input vector signals into an amplitude on a standard circle with a standard radius of 1.0. For this purpose, the inverse number of the amplitude of the input vector signals is computed using a multiplier (78), a constant setting device (80), a power computing device (82) and a loop processing part (84). First, the level of the input vector signal is reduced so that it will not overflow, even if multiplication and computation are carried out using a constant $(1/\sqrt{2})$ from the constant setting device (80) in the multiplier (78). Subsequently, the power computing device (82) is used to compute the power of the input vector signal. The loop processing part (84) comprises multipliers (85, 88), an adder (90), a constant setting device (92), a multiplier (94), an adder (96), and a tap (98). The multipliers (86, 88) multiply the output signal from the power computing device (82) by a tap value (INV) generated at the tap (98) twice. The adder (90) derives the error by deducting the output signal from the multiplier (88) from a reference ($\frac{1}{2}$) set at the constant setting device (92). The multiplier (94) multiplies the error derived at the adder (90) with the tap value (INV) to normalize the loop gain. The adder (96) adds the error $\Delta$ derived from the multiplier (94) to the current tap value (INV) to renew the tap value (INV) at the tap (98). More specifically, the loop processing at the loop processing part (84), using an initial for tap value (INV) of 0.7559 in the tap (98), is repeated five times. An inverse value of the amplitude with the error ($\Delta$) suppressed to about 0.01 dB can thus be derived as a tap value (INV). The tap value (INV) from the tap (98), which is the inverse of the input vector signal amplitude derived by the loop processing part (84), is multiplied by the input vector signal using the multiplier (76) to normalize the amplitude on the standard circle with the standard radius of 1.0.

Figure 10:
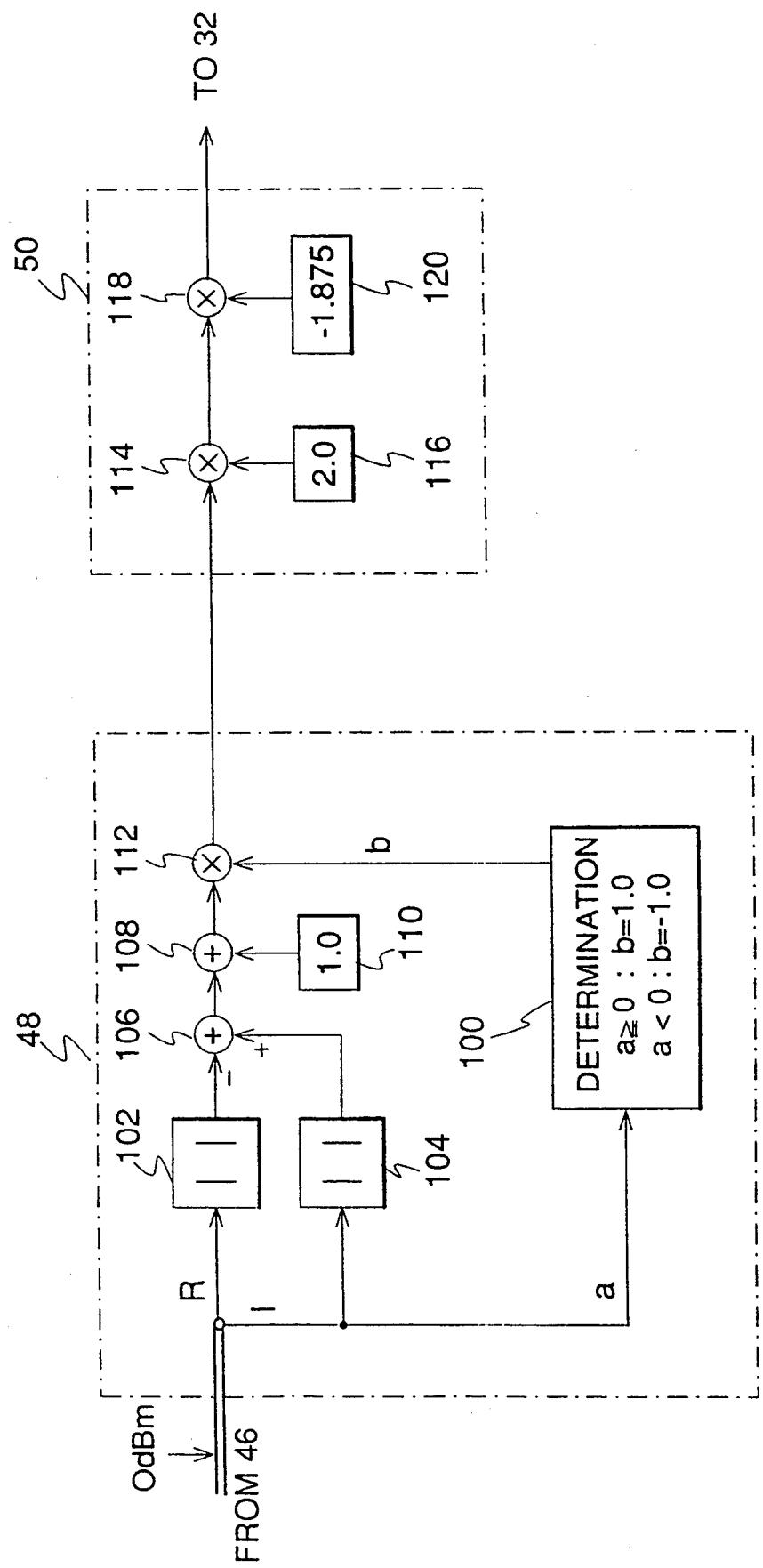
FIG. 10 is a block diagram showing details of the scalar converting circuit and offset correcting circuit shown in FIG. 4.

FIG. 10 shows equivalent circuits that use vector computation by a scalar converting circuit (48) and an offset value correcting circuit (50). The scalar converting circuit (48) converts the sin $\theta_2$, using a vector signal derived from the second inverse number computing circuit (46), into a scalar constant, angle $\theta_2$, to show the frequency offset. Therefore, the scalar converting circuit (48) is disposed with absolute number circuits (102) and (104), adders (106) and (108), a constant setting device (110), a determining part (110) and a multiplier (112). The input vector signal is divided into real components and imaginary components to derive the respective absolute numbers using the absolute number circuits (102) and (104), and then added using the adder (106). Tile numbers are then added to a constant 1.0 by the adder (108), multiplied by a coefficient "b" as determined by the determining part (110) in the adder (112), and converted to the phase angle $\theta_2$ as a scalar volume. The determining part (100) inputs the imaginal component I as a signal "a" and determines the polarity of this signal. If the signal "a" is greater than zero, the vectors are in the first and second quadrants. On the other hand, if the signal "a" is less than zero, the vectors are in the third and fourth quadrants. In these cases, the range of values handled by the scalar computing circuit (48) is from 0 to +2 for phase angles from 0 to $\pi$, and from −2 to 0 for phase angles from $\pi$ to $2\pi$. Therefore, for the first and the second quadrants (i.e. those in which the determined polarity is positive ($a \geq 0$)), $b = 1.0$ is output to the multiplier (112), and for the third and the fourth quadrants (i.e. those in the determined polarity is negative ($a < 0$)), $b = -1.0$ is output to the multiplier (112).

The offset value correcting circuit (50) corrects the level of the frequency offset value $\theta_2$ derived by the scalar converting circuit (48) to match the frequency offset value $\theta_1$, which is computed in the automatic carrier phase-controlling part circuit (26) in a manner described later in this specification. Hereupon, the frequency offset follow-up range in the automatic carrier phase-controlling part (26) shown in FIG. 3 is 8 Hz or higher. Therefore, the offset phase angle $\theta$ at a frequency offset of 8 Hz in the symbols SP1 and SP3, SP2 and SP4, and SP3 and SP5, which have sampling frequency of 240 Hz that computes the phase difference shown in FIG. 7 is:

$$\theta = (8 \text{ Hz}/240 \text{ Hz}) \times 360° \times 2 \text{ samples} = 24°$$

At the same time, the value of the automatic carrier phase-controlling part at a frequency offset of 8 Hz is −2.0. Therefore, if the offset value correction coefficient used in the offset value correcting circuit (50) shown in FIG. 10 is $\alpha$, $$2 \times (24°/90°) \times \alpha = -2,$$

hence, $$\alpha = -3.75$$

In this case, since the offset value correcting part (50) can only handle fixed point data in a range from +2.0 to −2.0, the value is divided $$\alpha = -3.75 = 2 \times -1.875$$

and multiplied by a value of 2.0 from the constant setting device (116) using the multiplier (114). Subsequently, a constant −1.875 is multiplied from the constant setting device (120) using the multiplier (118). The final result is the same as multiplying the correction coefficient $\alpha = -3.75$.

Figure 11:
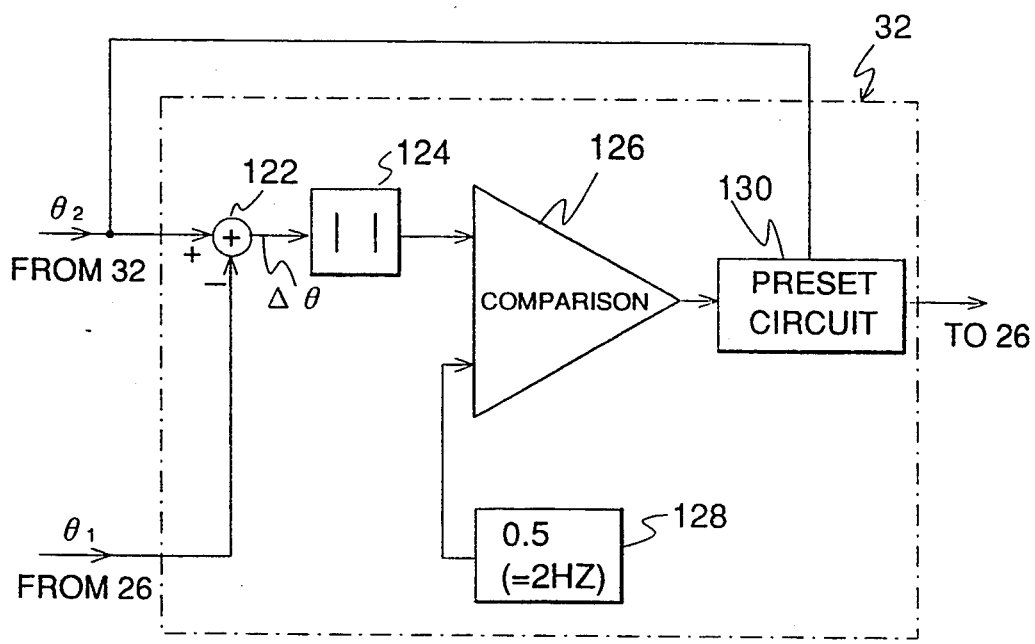
FIG. 11 is a block diagram showing details of the offset renewal circuit shown in FIG. 3.

FIG. 11 shows an equivalent circuit in the offset renewal part (32) shown in FIG. 3. The offset renewal part (32) is disposed with the adder (112) to input the frequency offset value $\theta_2$ from the frequency offset computing part (30) in the former stage and the frequency offset value $\theta_1$ from the automatic carrier phase-controlling part (26), and to derive the difference $\Delta\theta$ between both values. This difference $\Delta\theta$ is compared with a reference value of 0.5 from a constant setting device (128) using a comparing circuit (126), after the absolute value has been obtained in an absolute value circuit (124). Since the difference $\Delta\theta$ is −2 at 8 Hz, the reference value of 0.5 corresponds to a frequency offset of 2 Hz. Therefore, the comparing circuit (126) generates comparison output at a present circuit (130) when the difference $\Delta\theta$ between the frequency offset values $\theta_1$ and $\theta_2$ becomes 0.5 or larger, or 2 Hz or higher. In either of these cases, the frequency offset value $\theta_1$ from the automatic carrier phase-controlling circuit (26) is forcibly initialized by the frequency offset value $\theta_2$ from the offset computing part (30).

FIG. 12 shows the automatic carrier phase-controlling circuit (26) shown in FIG. 3 in the form of an equivalent circuit using vector computation. The automatic carrier phase-controlling circuit (26) comprises a normalizing circuit (132), a first integrating circuit (136), a second integrating circuit (156) and an amplitude normalizing circuit (inverse number computing circuit) (178). The normalizing circuit (132) multiplies an equalizing signal from the automatic equalizer (24) with a normalizing signal from the determining part (28) to normalize and output the imaginary components in the form of remaining equalizing components. The first integrating circuit (136) is disposed with a multiplier (138), a constant setting device (140), an adder (142), a tap (144), a multiplier (146) and a constant setting device (148), generating the frequency offset value $\theta_1$, based on output from the normalizing circuit (132), to be the tap value in the tap (144). The constant setting devices (140) and (180) set the controlling force that determines the change in one processing cycle. The result from the first integrating circuit (136) is added using an adder (154) to the normalized output, which has been multiplied by the controlling force from a constant setting device (152) using a multiplier (150); it is then input into the second integrating circuit (156). The second integrating circuit (156) comprises a multiplier (158) and an adder (160) disposed for the real components; a multiplier (162) and an adder (164) disposed for the imaginary components; a multiplier (166) for normalizing amplitudes; and a tap (168). The second integrating circuit (156) generates a vector component that acts as a frequency offset correcting signal and which rotates inversely in an amount equal to the frequency offset value $\theta_1$ (168); the circuit outputs this vector into multipliers (194) and (196) in the automatic equalizer (24).

Inverse number computation to normalize the amplitude uses the multiplier (166) disposed in the second integrating circuit (156) and is performed in an amplitude normalizing circuit (170). This amplitude normalizing circuit has the same configuration as the second inverse number computing circuit (46) shown in FIG. 8. That is, it comprises a multiplier (172), which multiplies the constant ($1\sqrt{2}$) from a constant setting device (174) in order to prevent overflows; a power computing device (176); multipliers (180) and (182), which multiply the tap value twice; an adder (184), which deducts the output of the multiplier (182) from the reference ($\frac{1}{2}$) of a constant setting device (186): a multiplier (188), which multiplies the tap value by the error value from an adder (184) to adjust the loop gain; an adder (190), which renews the tap value; and a tap (192), which generates the tap value.

The frequency offset value $\theta_1$ at the tap (144) in the first integrating circuit (136) of the automatic carrier phase-controlling circuit (26) is provided to the offset renewal parts (32) shown in FIG. 11, and is compared with the frequency offset value $\theta_2$, which is derived separately by the frequency offset computing part (30). When the difference $\Delta\theta$ between the two frequency offset values $\theta_1$ and $\theta_2$ has reached a predetermined value, such as 2 Hz, a large frequency offset occurs because of line switching induced fluctuations in the network. In such a case, a frequency offset follow-up delay caused by the automatic carrier phase-controlling circuit (26) has occurred relative to the above large frequency offset. The frequency offset value $\theta_1$ at the tap (144) disposed in the first integrating circuit (136) is initialized forcibly to the frequency offset value $\theta_2$ from the frequency offset computing part (30) installed separately.

With the above configurations, even frequency offsets that exceed half the symbol phase angle on the phase determining plane can be corrected, and a normal state of communications automatically restored. Problems such as deadlock of the automatic carrier phase-controlling circuit (26) are avoided.

While the above embodiment has been explained as a modem modulation that receives signals from a secondary channel with a modulation rate of 48 baud, the present invention should not be limited to this embodiment. It can be applied without modification to any appropriate modem modulation. Further, the above-described equivalent circuit using vector computation is achieved by program control of the modem MPU and DSP. In addition, the present invention is not restricted to the values given in the embodiment.

What is claimed is;

1. A method for removing a frequency offset contained in modem reception signals, the method comprising:

a sampling step for digitally sampling and outputting vector signals each having a real component and an imaginary component from reception signals received from a transmission line;

an equalizing step for eliminating a distortion due to an inter-code interference on said transmission line in the vector signals obtained in said sampling step;

a determining step for determining a correct signal point on a phase plane from an equalized output signal obtained in said equalizing step so as to produce a determination signal;

a carrier phase controlling step including:

a first integrating step of computing a first frequency offset value ($\theta_1$) on the basis of an equalization residual signal, obtained as a difference between said equalized output signal from said equalizing step and said determination signal from said determining step, and said equalized output signal, a second integrating step of producing an offset elimination signal having a minus frequency component from said first frequency offset value ($\theta_1$) computed in said first integrating step, and a correcting step of correcting said equalized output signal and said equalization residual signal by said offset elimination signal produced in said second integrating step;

a frequency offset computing step for computing a second frequency offset value ($\theta_2$) from the vector signals obtained in said sampling step; and an updating step for comparing the second frequency offset value ($\theta_2$) computed in said frequency offset computing step with said first frequency offset value ($\theta_1$) computed in said first integrated step of said carrier phase controlling step, and substituting said first frequency offset value ($\theta_1$) with said second frequency offset value ($\theta_2$) when a difference between said first frequency offset value and said second frequency offset value exceeds a predetermined value.

2. A method according to claim 1, wherein said frequency offset computing step comprises:

a phase difference computing step for computing a phase difference between a preceding vector signal and a present vector signal each time a vector signal is sampled and outputted in said sampling step to obtain a plurality of phase difference signals;

an averaging step for computing an average value of said plurality of phase difference signals obtained in said phase difference computing step;

an inverse number computing step for normalizing an amplitude of said phase difference signals received from said averaging step to a predetermined value;

a converting step for converting the signals obtained in said inverse number computing step into signals having said second frequency offset value ($\theta_2$); and a level converting step for level converting said second frequency offset value ($\theta_2$) of the signals obtained in said converting step so as to produce the same level range as that of said first frequency offset value ($\theta_1$) computed in said first integrated step of said carrier phase controlling step.

3. A device for removing a frequency offset in modem reception signals, comprising:

sampling means for digitally sampling and outputting vector signals each having a real component and an imaginary component from reception signals received from a transmission line;

equalizing means for eliminating a distortion due to an inter-code interference on said transmission line in the vector signals obtained by said sampling means;

determining means for determining a correct signal point on a phase plane from an equalized output signal from said equalizing means to produce a determination signal;

a carrier phase control means including:

first integrating means for computing a first frequency offset value ($O_1$) on the basis of an equalization residual signal, obtained as a difference between said equalized output signal from said equalizing means and said determination signal from said determining means, and said equalized output signal, second integrating means for producing an offset elimination signal having a minus frequency component from said first frequency offset value ($O_1$) computed by said first integrating means, and correcting means for correcting said equalized output signal and said equalization residual signal by said offset elimination signal produced by said second integrating means;

frequency offset computing means for computing a second frequency offset value ($\theta_2$) from said vector signals outputted from said sampling means; and renewing means for comparing said second frequency offset value ($\theta_2$) computed by said frequency offset computing means and said first frequency offset value ($\theta_1$) computed by said first integrating means of said carrier phase-control means and for substituting said first frequency offset value ($\theta_1$) with said second frequency offset value ($\theta_2$) when a difference between said first frequency offset value ($\theta_1$) and said second frequency offset value ($\theta_2$) exceeds a predetermined value.

4. A device according to claim 3, wherein said frequency offset computing means comprises:

a phase difference computing means for computing a phase difference between a preceding vector signal and a present vector signal each time a vector signal is outputted from said sampling means to obtain a plurality of phase difference signals;

low pass filter means for computing an average value of said plurality of phase difference signals obtained by said phase difference computing means;

inverse number computing means for normalizing an amplitude of said phase difference signals received from said low pass filter means;

a scalar converting means for converting the signals obtained in said inverse number computing means into signals having said second frequency offset value ($\theta_2$); and level converting means for level converting said second frequency offset value ($\theta_2$) of the signals obtained by said scalar converting means so as to have the same level range as that of said first frequency offset value ($\theta_1$).

5. A device according to claim 4, wherein said sampling means samples the vector signals at a sampling rate which is N times as fast as a modulation rate, and said phase difference computing means computes phase differences among N vector signals sampled during one symbol cycle, which is given by an inverse value of the modulation rate.

6. A device according to claim 5, wherein said phase difference computing means computes the phase difference signal between every two other vector signals among said N vector signals sampled during one symbol cycle which is given by the inverse value of the modulation rate and computes said phase difference signal ($N-2$) times every one symbol cycle and supplies said phase difference signal to said low pass filter means at the next stage.

7. A device according to claim 6, wherein each time the phase difference signal is output from said phase difference computing means said low pass filter means obtains the average value of said plurality of phase difference signals for a predetermined time and outputs a newly computed average value to the inverse number computing means at a next stage once for a one-symbol period.

8. A device according to claim 4, further comprising a floating point converting means for converting a vector signal of a fixed decimal point into a vector signal of a floating decimal point, said floating point converting means being provided subsequent to said sampling means; said phase difference computing means and said low pass filter means processing said vector signal of a floating decimal point; said inverse number computing means further including first inverse number computing means for normalizing said vector signal of a floating decimal point to an amplitude value which is inscribed in a standard circle of a standard radius 1.0, fixed point converting means for converting the vector signal of a floating decimal point output from said first inverse number computing means into a vector signal of a fixed decimal point, and second inverse number computing means for normalizing the vector signal converted into the vector signal of the fixed decimal point by said fixed point converting means to an amplitude value which is inscribed in a standard circle of a standard radius 1.0.

* * * * *